United States Patent
Canim et al.

(10) Patent No.: US 10,534,862 B2
(45) Date of Patent: Jan. 14, 2020

(54) RESPONDING TO AN INDIRECT UTTERANCE BY A CONVERSATIONAL SYSTEM

(71) Applicant: International Business Machines Corporation, Armonk, NY (US)

(72) Inventors: Mustafa Canim, Ossining, NY (US); Robert G Farrell, Cornwall, CT (US); Achille B Fokoue-Nkoutche, White Plains, NY (US); John A Gunnels, Somers, NY (US); Ryan A Musa, New York, NY (US); Vijay A Saraswat, Mapopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/886,037

(22) Filed: Feb. 1, 2018

(65) Prior Publication Data

US 2019/0236140 A1 Aug. 1, 2019

(51) Int. Cl.
*G06F 17/27* (2006.01)
*G10L 15/00* (2013.01)

(52) U.S. Cl.
CPC ...... *G06F 17/2785* (2013.01); *G06F 17/2705* (2013.01)

(58) Field of Classification Search
CPC .............. G06F 17/2705; G06F 17/2785
USPC ............................................. 704/9
See application file for complete search history.

(56) References Cited

U.S. PATENT DOCUMENTS

| | | | |
|---|---|---|---|
| 6,223,150 B1 | 4/2001 | Duan | |
| 8,706,503 B2* | 4/2014 | Cheyer | G06F 17/3087 704/275 |
| 8,799,000 B2* | 8/2014 | Guzzoni | G06F 17/3087 704/270.1 |
| 8,873,813 B2 | 10/2014 | Tadayon | |
| 9,524,291 B2 | 12/2016 | Teodosiu | |
| 2015/0310862 A1 | 10/2015 | Dauphin | |

(Continued)

FOREIGN PATENT DOCUMENTS

| | | |
|---|---|---|
| CN | 103699663 | 4/2014 |
| EP | 1290574 | 2/2013 |

OTHER PUBLICATIONS

"Language to Logical Form with Neural Attention", Li Dong and Mirella Lapata, ACL 2016, Institute for Language, Cognition and computation, Aug. 8, 2016.

(Continued)

*Primary Examiner* — Khai N. Nguyen
(74) *Attorney, Agent, or Firm* — Jeffrey S LaBaw; Feb R Cabrasawan

(57) ABSTRACT

A method, apparatus and computer program product for responding to an indirect utterance in a dialog between a user and a conversational system is described. An indirect utterance is received. A parse structure of the indirect utterance is generated. The indirect utterance is an utterance which does not match a user goal expressed as elements of a knowledge graph. The parse structure is connected through the knowledge graph to a user goal to issue a request which is not stated in the indirect utterance. A system response is performed, where the system response is a dialog system response based on a combination of the parse structure and the connected user goal.

16 Claims, 8 Drawing Sheets

(56) References Cited

U.S. PATENT DOCUMENTS

| | | | |
|---|---|---|---|
| 2015/0332672 | A1 | 11/2015 | Arbacak |
| 2015/0379414 | A1 | 12/2015 | Yeh |
| 2016/0196587 | A1* | 7/2016 | Eder ................. G06Q 30/00 705/14.49 |
| 2016/0335909 | A1* | 11/2016 | Ambrose ............... G09B 19/00 |
| 2016/0350834 | A1* | 12/2016 | Wilson ............... G06Q 30/0631 |
| 2017/0024375 | A1 | 1/2017 | Hakkani-Tur |
| 2017/0140262 | A1* | 5/2017 | Wilson .................... H04L 67/42 |
| 2018/0060301 | A1* | 3/2018 | Li ........................ G06F 17/2775 |
| 2018/0268456 | A1* | 9/2018 | Kumar ............... G06Q 30/0625 |

OTHER PUBLICATIONS

"Leveraging Knowledge Graphs for Web-Scale Unsupervised Semantic Parsing", Heck et al., Interspeech 2013.

"Constructing knowledge graph from unstructured text", Kumar et al., Department of Computer Science and Engineering India Institute of Technology Kanpur, Apr. 2015.

"Inducing Probabilistic CCG Grammars from Logical Form with Higher-Order Unification", KWiatkowski et al., Proceedings of the 2010 Conference on Empirical Methods in Natural Language Processing, pp. 1223-1233, MIT, Massachusetts, USA, Oct. 9-11, 2010. c 2010 Association for Computational Linguistics.

"A Review of Relational Machine Learning for Knowledge Graphs", Nickel et al., arXiv1503.00759v3, Sep. 28, 2015.

Software(/software/) > Stanford Parser (/software/lex-parser.html)> Neural Network Dependency Parser, TThe Standard Natural Language Processing Group, Web page retrieved Dec. 7, 2017 from https://nlp.stanford.edu/software/nndep.shtml.

Yeh, P., Porter, B., Barker, K. (Oct. 2, 2005). Matching Utterances to Rich Knowledge Structures to Acquire a Model of the Speakers Goal; Department of Computer Sciences University of Texas, Austin Austin, TX 78712.

Hakkani-Tur, D., Celikyilmaz, A., Heck, L., Tur, G., and Zweig, G. (Sep. 1, 2014). Probabilistic Enrichment of Knowledge Graph Entities for Relation Detection in Conversational Understanding; Microsoft, Redmond, WA.

Yih, W., Chang, M., He, X., Gao, J. (2015). Semantic Parsing via Staged Query Graph Generation: Question Answering with Knowledge Base; Microsoft Research, Redmond, WA.

"Reading and Reasoning with Knowledge Graphs", Gardner, Thesis, School of Computer Science Carnegie Mellon University, 2015.

"Speech Acts and Natural Language Processing", Lee, Thesis found at http://www.imperial.ac.uk/pls/portallive/docs/1/18619776.PDF.

"Semi-supervised Speech Act Recognition in Emails and Forums" Jeong et al.,Proceedings of the 2009 Conference on Empirical Methods in Natural Language Processing, pp. 1250-1259, Singapore, Aug. 6-7, 2009.

"An Account of Opinion Implicatures" Wiebe et al., arXiv:1404. 6491v1 [cs.CL] Apr. 23, 2014.

"Leveraging Knowledge Graphs for Web-Scale Unsupervised Semantic Parsing", Heck et al., InterSpeech 2013, Aug. 25-29, 2013.

"Semantic Parsing via Staged Query Graph Generation: Question Answering with Knowledge Base", Yih et al., Proceedings of the Joint Conference of the 53rd Annual Meeting of the ACL and the 7th International Joint Conference on Natural Language Processing of the AFNLP | Jul. 2015 Published by ACL—Association for Computational Linguistics.

"Plan Recognition in Natural Language Dialogue", Carberry, Abstract of Book,MIT Press Cambridge, MA, USA, 1990.

IBM Patents or Patent Applications Treated As Related.

* cited by examiner

RESPONDING TO AN INDIRECT UTTERANCE BY A CONVERSATIONAL SYSTEM

BACKGROUND OF THE INVENTION

This disclosure relates generally to natural language processing. More particularly, it relates to providing a natural language interface for a user to content managed by a data processing system.

Applications such as virtual agents and "chat bots" have been developed to provide a natural language interface to web content, apps and channels in retail, automotive, healthcare and other industries. These applications gather information through a written or spoken dialog with a user and assist the user with common tasks such as providing answers of frequently asked questions and helping a user complete an online transaction. Such conversational systems increase the accessibility of the web content and other documents as they interact with end users in natural languages. These types of chat bot applications offer great practical value to the organization hosting the web content or other documents in reducing the number of human help agents needed to answer questions about the documents and perform transactions and other requests on behalf of the user. These applications provide a friendlier interface for the organization.

However, it is a very challenging task to develop an artificial intelligence application for natural language based interaction with end users. One of the greatest challenges is generating the dialog flows to guide the conversation of the application. Human authored dialog flows are costly in time and money to develop. Despite the subject matter expertise and time that goes into these hand-crafted flows, users will often produce utterances which the system designers do not anticipate. One type of user utterance that is often not anticipated is an indirect utterance which may imply a particular user goal, but does not explicitly state what the user wants.

For example, "I am retired" may be a fact, but the same statement in the context of an insurance processing system could also imply that the user wants the retiree discount. Establishing a logical connection between the indirect utterance and a goal to get information or perform a transaction can be difficult. Words in the utterance may not directly match the goal. Furthermore, the goal may not be previously established in the dialogue.

Therefore, a method is needed in computer aided natural language processing to establish a logical connection between an indirect utterance and a dialogue goal so that more efficient dialogues can be supported.

BRIEF SUMMARY

According to this disclosure, a method, apparatus and computer program product for responding to an indirect utterance in a dialogue between a user and a conversational system is described. An indirect utterance is received. A parse structure of the indirect utterance is generated. The indirect utterance is an utterance which does not match a user goal expressed as elements of a knowledge graph. The parse structure is connected through the knowledge graph to a user goal to issue a request which is not stated in the indirect utterance. A system response is performed, where the system response is a dialogue system response based on a combination of the parse structure and the connected user goal.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, preferred embodiments of the invention provide a system, method and computer program product for handling indirect utterances in a conversational system or dialogue system. Indirect utterances are statements that are really meant as requests, however, they are statements. These statements do not match the logical form of the requests handled by the system. Thus the dialogue system or conversational system cannot directly generate a response based upon the utterance. In embodiments of the invention, utterances are parsed by a semantic parser that produces a logical form of a request. The utterances that fail the semantic parsing are then processed as implicit utterances and the system tries to find a logical connection to a dialogue goal, a goal to issue a request. The connection is performed through a knowledge graph produced from documents. The utterances that fail the semantic parser are passed to a syntactic parser (e.g., dependency parser). Portions of the syntactic parser result are then connected through the knowledge graph, with the help of a knowledge graph index, to the established dialogue goals (goal to issue requests) or, if the connection fails, to a request that was not previously established as a dialogue goal. Since the conversational system can generate system responses for all of the requests, an appropriate system response can be supplied for the indirect utterance, such as asking the user whether they would like to establish a goal to issue the request. In preferred embodiments, the conversation system can generate responses for the requests from both the semantic parser result as well as those that fail the semantic parser, by utilizing the syntactic parser and the knowledge graph, with the help of the knowledge graph index.

The invention establishes a logical connection between an indirect utterance and a dialogue goal so that more efficient dialogues can be supported. By more efficient, the inventors mean that the system is able to process more utterances to achieve dialogue goals such as getting information, performing transactions, or other requests. As used in the present disclosure, a "transaction" is any operation on data carried out by a computer system, including a natural language response to a user query. As used in the present disclosure, a "user goal" is often a transaction with a computer system, but also includes an informational presentation of available transactions and actions which may also comprise user input to the system.

Figure 1:
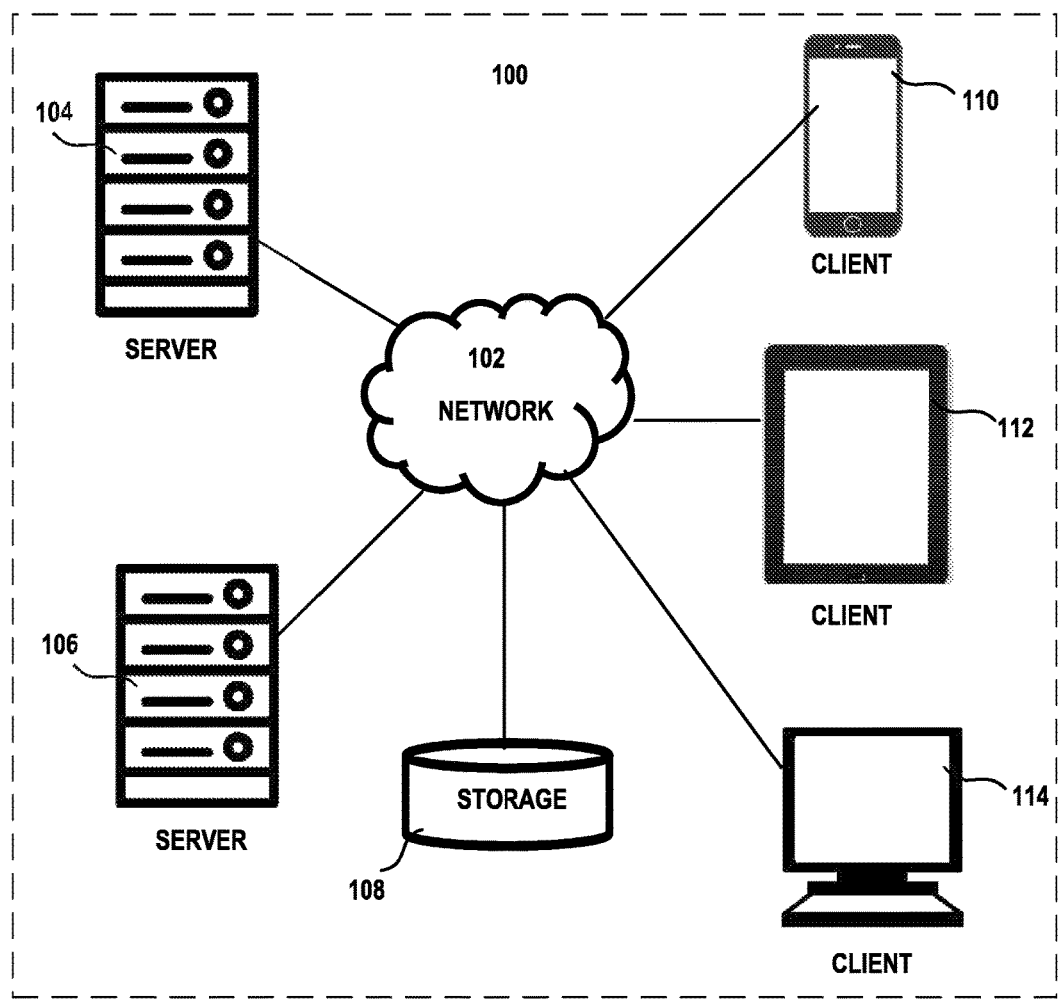
FIG. 1 depicts an exemplary block diagram of a distributed data processing environment in which exemplary aspects of the illustrative embodiments may be implemented.
Figure 2:
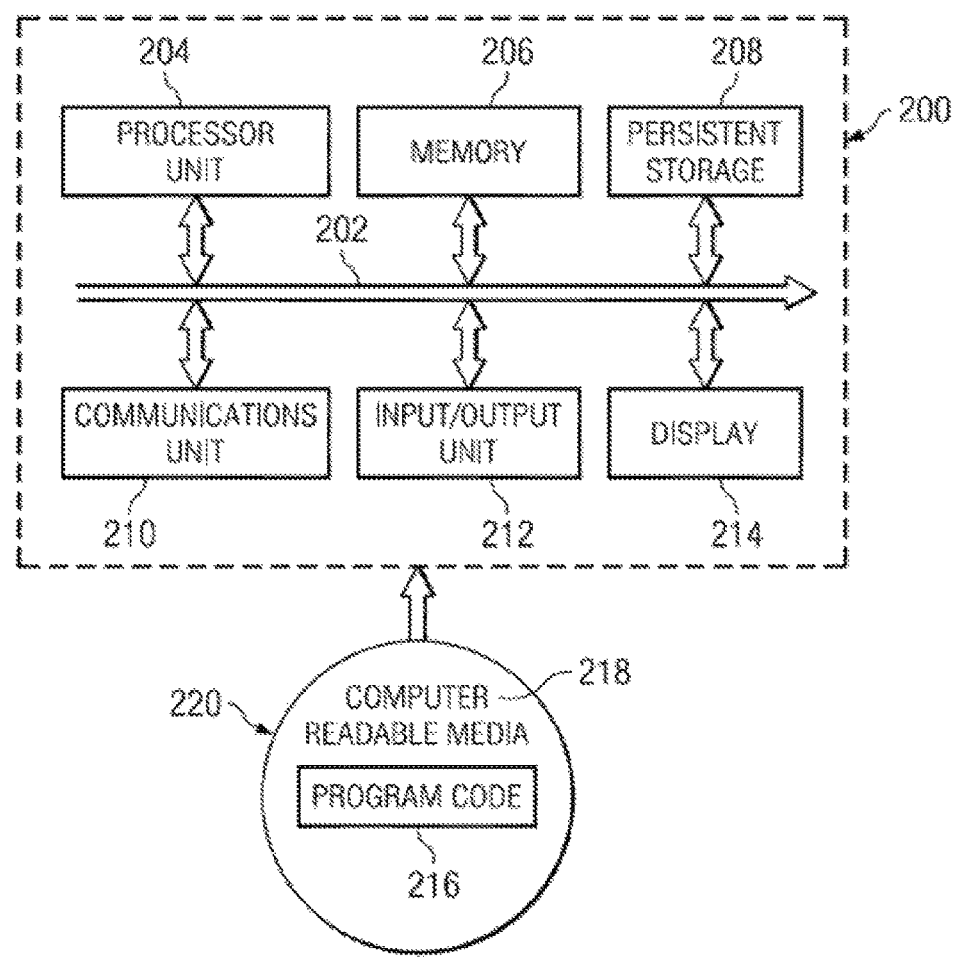
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The general operation of the system is as a conversational or dialogue system. The user speaks or types an utterance that could be a question (a request for information), a statement (a fact that is asserted into the reasoning system), a goal (a request to get information or to perform an operation by the system), or a command (a request to perform an operation by the system). Typically, the utterance is short text containing relatively few concepts. The recognized text is parsed using a parser or multiple parsers into an input logical form which is typically a hierarchical symbolic format. The input logical form can be processed directly by the dialogue system or passed to a reasoning system, rule-based system, or logic system such as a Prolog system.

In those embodiments in which the reasoning system is a Prolog system, a request is processed as a Prolog goal. A goal is solved using a set of rules that are pre-stored in the reasoning system and it computes bindings for variables that contain the answers to the question. A statement is processed as a Prolog fact. A fact is added to the fact base of the reasoning system and facts may be used in the bindings to goals. During the processing of a goal, a command may be sent to a back-end system for processing. A back-end system may be a transaction system that performs an action such as updating a record. The back-end system may also be accessed during the processing of goals to compute something that is returned and is bound to a variable. The bindings are translated into a natural language system response using a natural language generation subsystem and then sent back to the user as the answer to the question from the dialogue system. There are many known natural language generation subsystems which can be used in embodiments of the invention. For commands, the system performs the requested action and may also respond with a natural language acknowledgement, e.g., "OK".

Embodiments of the invention provide a dialogue system that can handle indirect utterances. Indirect utterances are statements that are facts but are also really meant as requests. Utterances that fail the semantic parsing are processed as implicit utterances and the system tries to find a logical connection to a dialogue goal.

The way this is accomplished is that the utterances that fail the semantic parser are passed to a syntactic parser, e.g., a broader, domain-general dependency parser. The dependency parser result is transformed in a logical form that is in the same format as the output of the semantic parser. Parts of this logical form are then compared to or connected through the knowledge graph, with the help of a knowledge graph index, to the requests. If a logical connection to a request can be made, then the system can use the request, such as recommending the user establish a goal to issue the request, without the user explicitly stating the desired dialogue goal in the user utterance.

In embodiments of the invention, if during a dialogue, a goal is not stated or explained by the system nor stated by the user, the user still has a chance to learn what an appropriate dialog goal could be. In this way, it makes the dialogue between user and system more efficient.

Figure 3:
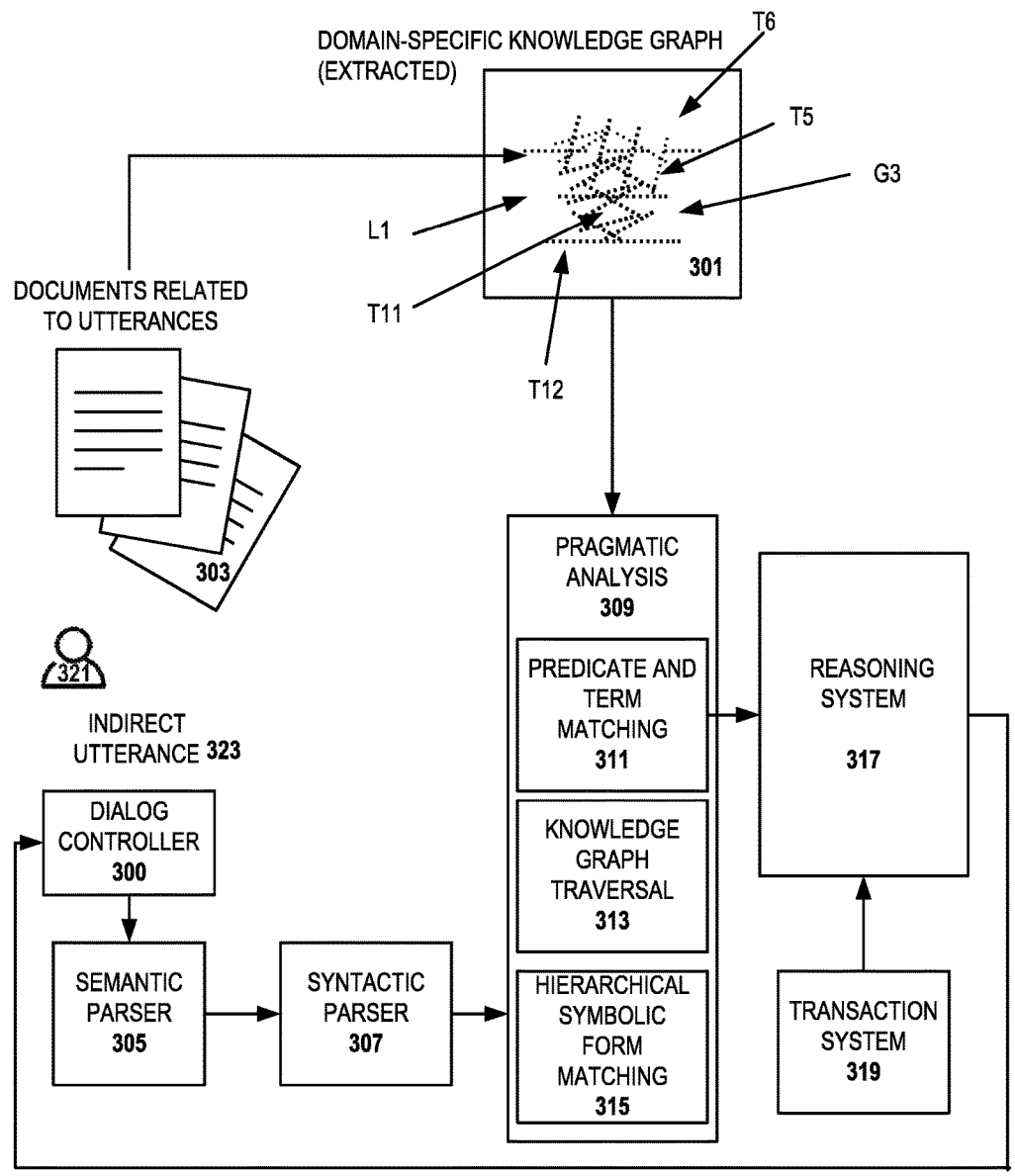
FIG. 3 illustrates an architectural diagram of components in the system which generates the conversational interface according to an embodiment of the invention.

FIG. 3 illustrates an architectural diagram of components in the system which generates the conversational interface according to an embodiment of the invention. In a preferred embodiment, the run-time system operates as part of a cloud computing environment. A client that is the chat program accepts the input and sends it to the run-time system. The dialog system controller 300 is the main interface with the user 321. The controller 300 contains authentication, user profile and natural language interpretation (possibly including spelling correction) and generation modules which respectively perform known functions to implement aspects of the present invention. In this embodiment, the knowledge graph 301 is built from the extracted knowledge of a set of documents related to the expected utterances 303 from users interacting with the conversational system. The arrows labelled L1, G3, T5, T6, T11, T12 point to specific nodes in the knowledge graph 301 which represent requests (such as transactions) that the system knows how to perform or goals to issue such requests that the system has already established for the user. Thus, all dialogue goals and requests are available for possible connection to user utterances. In alternative embodiments, the knowledge graph may be a general knowledge graph such as WordNet or Yago or some combination of a general knowledge graph and a knowledge graph built from the extracted knowledge of the set of documents. Elements of a knowledge graph can be any structures for composing requests that can then be made into goals for a user, such as symbols, logical forms, entities, relationships, objects, nodes, or links.

The dialog system controller 300 passes user utterances to the semantic parser 305 and if needed to the syntactic parser 307 in the processes discussed below. The pragmatic analysis unit 309 includes predicate and term modules 311, knowledge graph traversal module 313 and hierarchical symbolic form matching modules 315. In embodiments of the invention, the semantic parser 305, the syntactic parser 307 and the pragmatic analysis unit 309 are components of a user utterance analysis module. The system also includes a reasoning system 317 and back-end transaction system 319.

In embodiments of the invention, users access a web site and read the web pages and then type questions, statements, or commands to the dialogue system user interface that is part of the dialog system controller 300. The user's utterances may thus relate to the web site content. For example, they may read about discounts on homeowner's insurance or rental insurance and then access the dialogue system to type utterances. The utterances may be questions about discounts, statements about themselves or their house or apartment, and a desire to buy homeowner's or rental insurance. In other embodiments of the invention, the user utterances can be user speech recognized by a speech recognition system. There are many known speech recognition systems suitable for use in these embodiments.

Many of the user utterances from the user 321 will be utterances which the system can convert to a parse structure such as a logical form and in which the utterance will resolve to a request (possibly corresponding to a transaction) or a goal to later issue a request linked to the knowledge graph 301. The reasoning system 317 in conjunction with the request processing system (transaction system) will be able generate output that is then passed to the natural language generation module within the dialogue controller to generate certain system responses back to the user 321. However, it is likely that user 321 will make one or more indirect utterances 323 which the system cannot map directly to a request or goal to issue a request. Embodiments of the invention as described below provide solutions to this problem.

There may be initial data from a user profile. When the user logs in, the profile is loaded into the reasoning system 317. For example, the profile may contain the amount of the user's yearly payment and the discounts the user has. For example, they may have a discount for a low crime area. This type of data can be used to fill in a transaction or answer a question. When answering a question, in embodiments of the invention, the system makes a natural language response in the interface.

In alternative embodiments of the invention, the parse structure is one of a logical form, a constituency parse, phrase structure parse, dependency parse, universal dependency parse and an enhanced dependency parse. Examples of indirect utterances include a short text, an ungrammatical text, a chat text, a text message, a sentence in a natural language and transcribed speech in a dialogue exchange.

Figure 4:
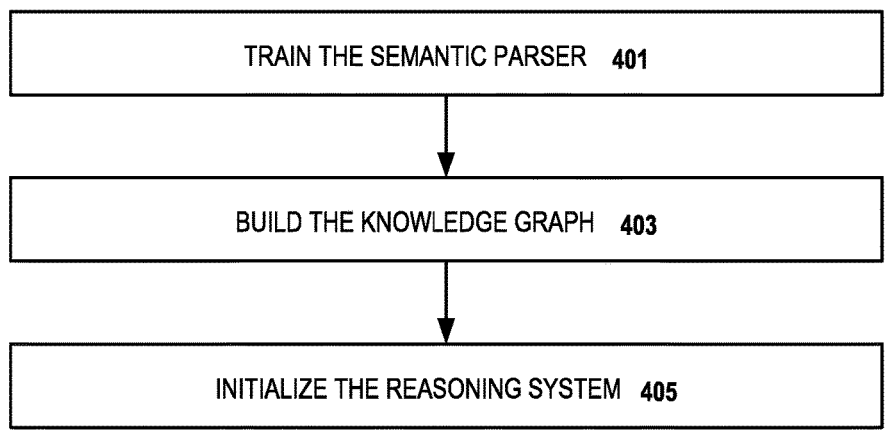
FIG. 4 illustrates a general flow diagram for system set-up according to an embodiment of the invention.

FIG. 4 illustrates a general flow diagram for system set-up according to an embodiment of the invention. Prior to running the system to handle the dialogue from the user, the following steps are taken: In step 401, the semantic parser is trained using a set of utterance/logical form pairs. These pairs typically come from annotating utterances in prior dialogues with their logical form equivalents. Next, in step 403, the knowledge graph is built using a known technique such as entity and relation extraction, selecting particular entities and relationships from an existing knowledge graph or multiple techniques. Then, the reasoning system is initialized in step 405 by inputting a desired set of rules. Each of these steps is discussed in greater detail with respect to a preferred embodiment, but those skilled in the art will recognize that many variations can be made within the scope of the invention.

One set-up task, step 401, is to train the semantic parser. The parser is given many <short text, logical form> pairs like the following:

short text: How much would my first payment be
logical form: (query (amountOf initial_payment:x))

One algorithm used for semantic parsing is the unification-based learning (UBL) algorithm which is suitable for embodiments of the invention. In preferred embodiments, the <short text, logical form> pairs used for training are produced from past user utterances to the dialogue system. Then, human annotators that know the format enter the logical form. The UBL semantic parser method is well known in the art, although other parsing algorithms are used in alternative embodiments of the invention.

Next, in step 403, a knowledge graph is built. There are various automated and semi-automated methods of building a knowledge graph. Some embodiments of the invention use entity and relation extraction to build the knowledge graphs from domain data such as databases incorporated in the back-end application or from unstructured text from a domain corpus. Other embodiments of the invention produce the knowledge graph by selecting entities and relationships from one of the large existing knowledge graphs like DBPedia. (http://wiki.dbpedia.org/) Yago https://en.wikipedia.org/wiki/YAGO_(database) or Freebase for the domain of interest for the conversational system.

In the description below, the knowledge graph reflects the entities and relationships mentioned in the web pages. It contains entities for people, organizations, events, policies, features of policies, discounts and so on. The knowledge graph contains parts of things, e.g., how the policies break down, branches of the military, but also contains types of things, e.g., types of people or organizations. It also contains relationships between the entities, such as a person being a leader of a country or an armed forces organization being a branch of the military. This knowledge graph can be enhanced by adding entities and relations from the large existing knowledge graphs. One skilled in the art will recognize that the teachings of the invention can be extended to web sites which handle transactions of different subjects.

The knowledge graph consists of entities with name and type attributes. The knowledge graph links the entity nodes through these binary relations. For example:
e1 "Army"/Organization, r1 branchOf, e2 "military"/Organization
In this example, e1 has a name attribute filled with "Army" and a type attribute filled with "Organization". Similarly, e2 has a name attribute filled with "military and a type attribute filled with "Organization". The relation r1 has a name of "branchOf" and a first argument of e1 and a second argument of e2.
This is a common way to organize a knowledge graph; other types of knowledge graphs are used in other embodiments of the invention.

Next, in step 405, the reasoning system is initialized. Rules are asserted into the reasoning system. One implementation of the reasoning system is Prolog, however, other reasoning systems are used in alternative embodiments of the invention. The reasoning system is a module where program logic is expressed as facts and rules. Given goals with unbound variables, the system applies rules and matches the facts. Backward chaining or forward chaining inference may be used. Goals may result in no solution or multiple solutions.

Figure 5:
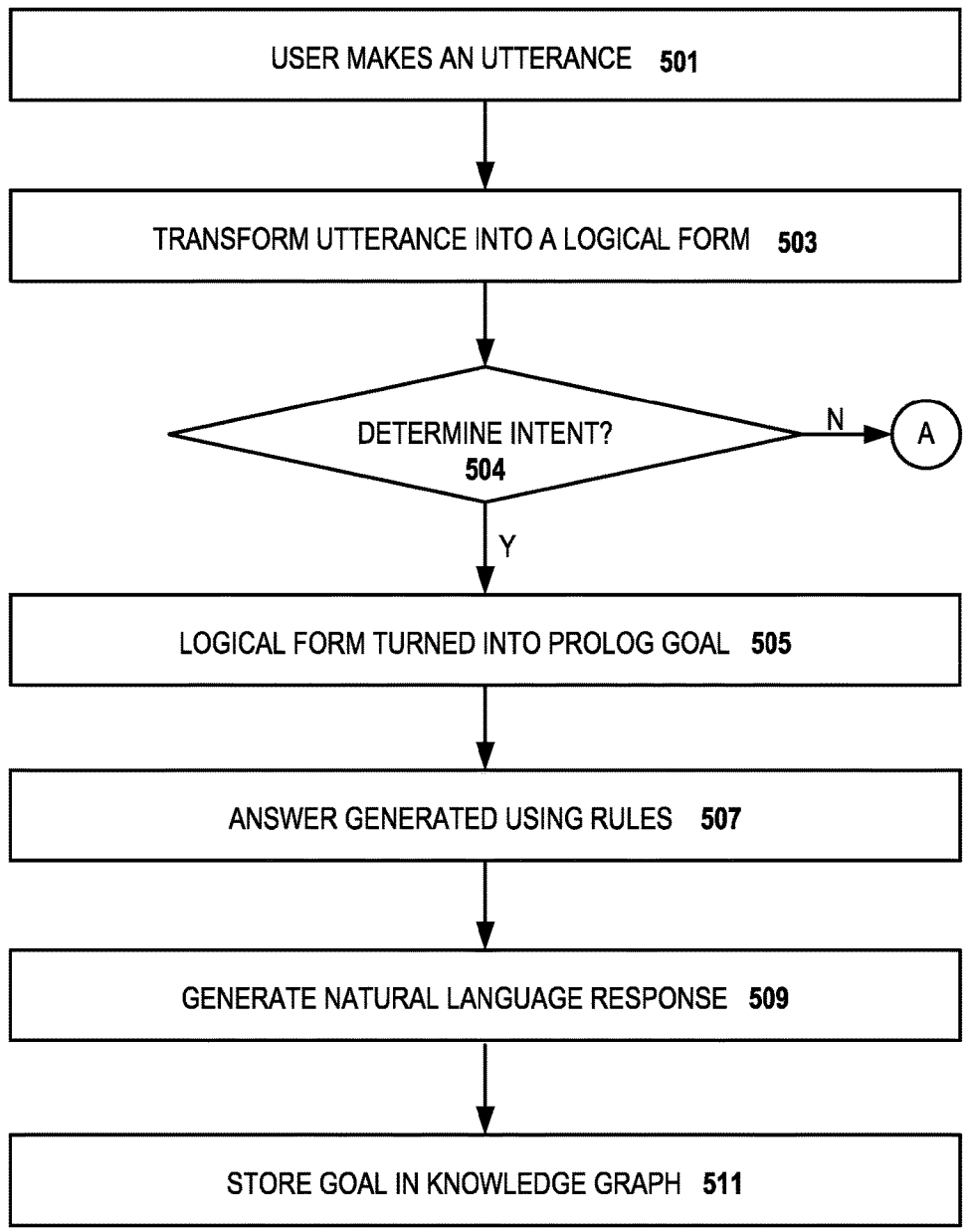
FIG. 5 is a high-level flow diagram of generating a system response from a user utterance.

As mentioned above, in a preferred embodiment, the run-time system operates in the cloud. A client that is the chat program accepts the input and sends it to the run-time system, e.g., using the HTTP protocol. FIG. 5 is a high-level flow diagram of generating a system response from a user utterance using the run-time system.

The user makes an utterance in step 501. For example, the user types a short text into a web page form being assisted by a chat bot or the short text is produced from the user's speech using speech recognition. Any method of capturing some amount of natural language text is possible in different embodiments of the invention. In general, the natural language text can contain errors or be ungrammatical.

The short text is transformed into a logical form, step 503. This step is accomplished in a series of sub-steps, e.g., using a spelling corrector (part of a dialog controller), the semantic parser, the dependency parser, and pragmatic analysis. Generally, the logical form starts with a user intent (a type of request) such as "query" or "calculate". For example, some short texts and their corresponding logical forms are listed below:
How much is my payment?
(query (amountOf payment), ?x)
How much will I pay a month?
(query (amountOf payment (months 1)), ?x)
These logical forms are hierarchical in nature. ?x is a variable; 'payment' is a symbol; 'query' is an intent; 'months' is a predicate; '1' is a number. In preferred embodiments, the form is an expression (predicate arg1 arg2 . . . argN) where the args are either symbols, numbers, or other expressions.

Other semantic parsing methods may be used, for example neural network methods. In addition, other natural language parsing methods may be used including relation extraction methods and then the output may be transformed into a logical form. In preferred embodiments, the system includes a spell checker, so the spell corrector fixes spelling of the user utterance, for example, "I joinedt the Army" into "I joined the Army." In preferred embodiments, the spelling corrector uses edit distance to perform the spelling correction operation.

Figure 6:
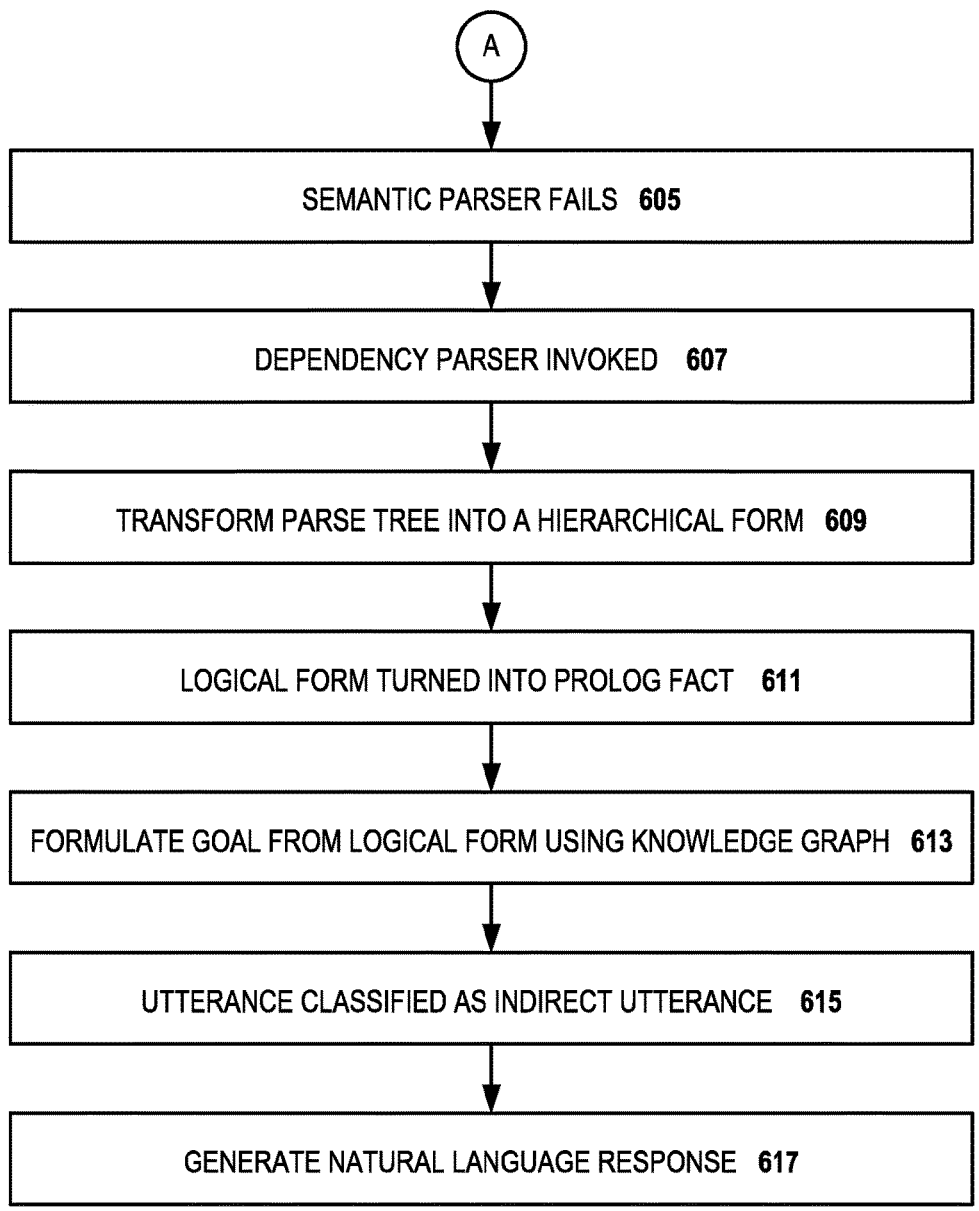
FIG. 6 is a flow diagram of generating a system response from an indirect user utterance according to an embodiment of the invention.

In step 504, a determination is made as to the intent of the logical form. If the intent can be determined the process continues to step 505. In preferred embodiments, the intent is identified using an ensemble of text classification techniques. Examples of these techniques include models that use word embeddings and convolutional and/or recurrent neural networks to encode the utterance into a tensor to predict the intent class, models that use discrete features extracted from the utterance to perform classification using support vector machines, decision trees/forests, or multinomial logistic regression and rule-based filters that assign intent based on key words or phrases in the utterance. However, any of these techniques may also be used alone as appropriate (for example, rule-based filters may be useful in a specific domain where training data is scarce). Additionally, intent classification can be performed as a ranking task, with top candidate intents passed forward through the processing pipeline (step 505) until a valid final solution is produced. If the intent cannot be determined, the process continues to A which is illustrated in FIG. 6.

The semantic parser may fail to produce a logical form because the input natural language was too different than the training examples provided. Thus, if the semantic parser is trained to recognize a set of requests, then when the input is not one of these requests the semantic parser will fail to produce a logical form.

In step 505, if the intent was a question ("What is my payment"?) or a request ("Give me rental insurance", the logical form is turned into Prolog as a Prolog goal, that is, the system binds variables and performs back-end operations. For example, here is a Prolog goal:
(query (amountOf payment), ?x)
Next, the answer is generated in Prolog using rules that look up the user's payment in the user profile or in other data sources, step 507.
For example,
(query (amountOf payment), ?x)
?x=500
X is a variable. X=500 is a binding of the number 500 to the variable X. There may be multiple bindings for X in some situations. There may be multiple variables such as the amount at a given time. Prolog is a prior art system that can handle these various variables in combination using resolution theorem proving. Other reasoning systems may be used, but they all produce bindings for the variables in the logical form.

Next, a natural language response to the user is generated in step 509 by the natural language subsystem. The natural language generation (NLG) subsystem can be a set of patterns or templates that take the bindings as input and generate a string. For example, given the template: "The amount of your payment is ?x dollars per month", the NLG subsystem converts the template into the natural language phrase "The amount of your payment is 500 dollars per month." The natural language text is passed back to the user interface 301. Natural language generation using templates is well known in the art. Other methods of natural language generation are used in other embodiments of the invention.

In step 511, if the intent is a goal, such as "I want a military discount":
(goal ('sign up'(me, 'military discount'(me)))
then the logical form is stored in the knowledge graph index Later in the dialogue, a logical connection can be made to this goal from an indirect utterance. Thus, the knowledge graph index contains both goals to issue requests that are stated and requests that have not been established as goals and are unstated. The invention allows the system to make a logical connection in both cases.

FIG. 6 is a flow diagram of generating a system response from an indirect user utterance according to an embodiment of the invention. The process from FIG. 5 at A joins the process depicted in this drawing.

The next step is a parse by the semantic parser, however, in this case, the semantic parser, e.g., a UBL parser, fails and produces no output, step 605. In this case, in step 607, the dependency parser is invoked. One dependency parser which can be used is a neural network dependency parser, although alternative embodiments of the invention use different dependency parsers. The dependency parser produces a grammatical structure which is well known in the art.

In some cases, the dependency parser cannot parse the input, in which case individual entities can be extracted using named entity recognition or Noun Phrase (NP) chunking or other methods. Ultimately if nothing can be parsed, the system will provide a default response such as "Could you please rephrase that?"

In embodiments of the invention, a hierarchical symbolic form, in the same syntax as the logical form from the semantic parser, is produced that combines the individual entities and the relations that are connected to entities.

For example, in the illustrative example, the dependency parser produces:
nsubj(joined/VBD, I/NP)
root(ROOT, joined/VP)
det(Army/NN, the/DET)
dobj(joined/VP, Army/NN)

In step 609, the system transforms the parse tree into a hierarchal form that is similar to the input logical form. An example transformation process is as follows: First, the system traverses from the ROOT node. Next, it collects the VP nodes (the verb phrase nodes, in this case just the one node ("joined/VP") and transforms the verbs to lemma forms (i.e., "joined" becomes "join"). Next, the system gets the next subject (nsubj) and next direct object (dobj) for these nodes (in this case "I/NP" and "Army/NN"). If one of these argument nodes is a VP node, the system returns to collecting the VP nodes. The process recurses until reaching the bottom of the parse tree.

An example logical form output is:
(join (I, Army))
In embodiments of the invention, words like "myself" and "I" are transformed into the canonical "me". For example,
(join(me, Army))
As one skilled in the art will appreciate, other methods may be used to transform the input into the logical form in other embodiments of the invention.

In step 611, the logical form is turned into a Prolog fact. For example,
join(me, Army)
However, this Prolog fact does not match the logical form of any goals in the knowledge graph. Also, there are no Prolog rules with "join" as a predicate, for example. The system does not know how to prove anything about people joining things. There are also no requests about "join". At this point, a conversational system without the invention would fail and would perform a default behavior, such as asking "Can I help you with ?" Instead, we call this an "indirect utterance" and process it.

Thus, embodiments of the invention attempt to formulate a goal to issue a request from this logical form using the knowledge graph. This is discussed in further detail with reference to FIG. 7 below. In embodiments of the invention, the utterance is classified as an indirect utterance, step 615. Also, a natural language response based on the logical form is formulated by the natural language subsystem and sent back to the user, step 617.

Figure 7:
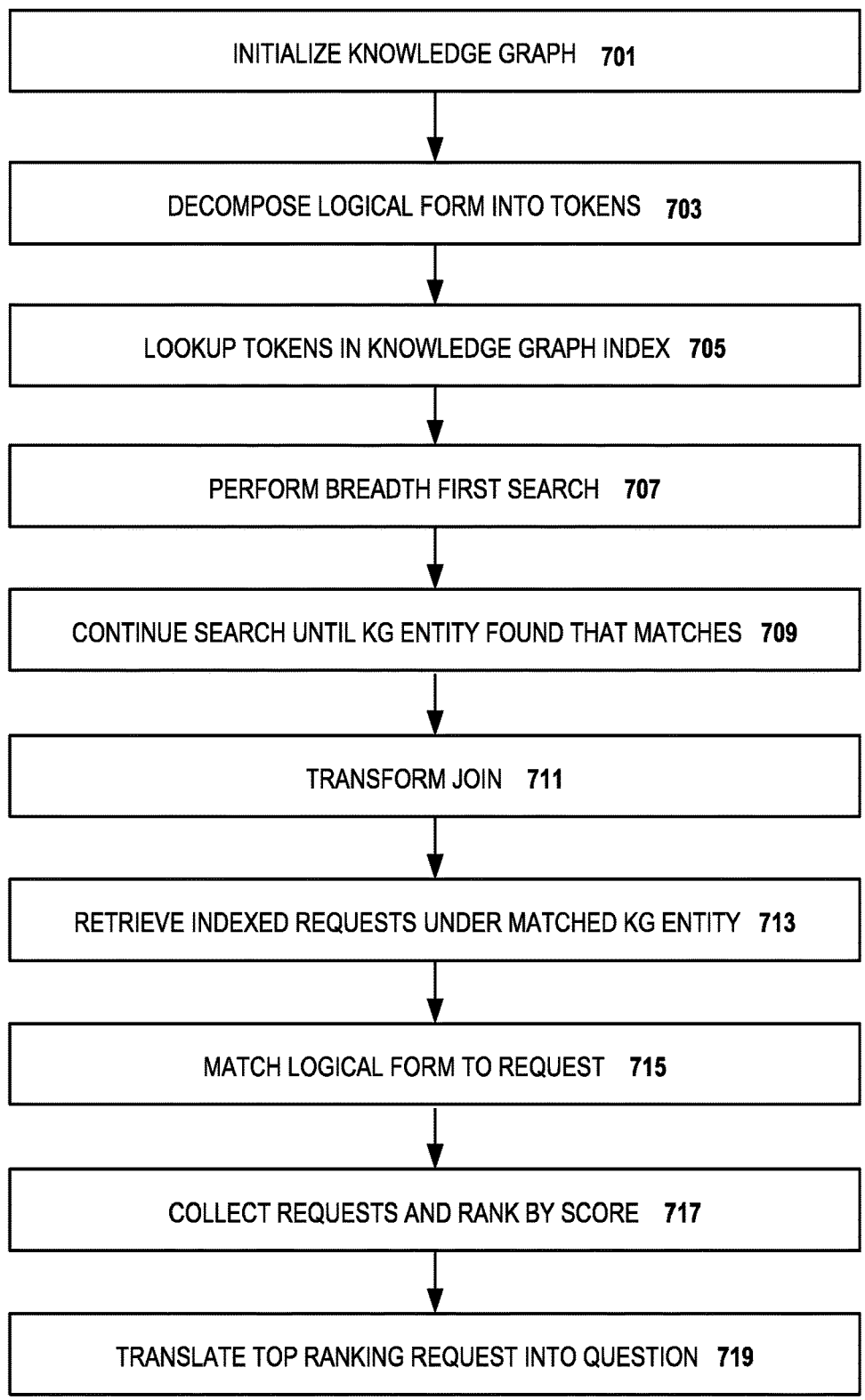
FIG. 7 is a flow diagram of formulating a goal from a logical form using the knowledge graph one embodiment of the invention.

In embodiments of the invention, a pragmatic analysis subsystem attempts to formulate a goal to issue a request from the logical form using the knowledge graph. FIG. 7 shows a flow diagram of formulating a goal to issue a request from a logical form using the knowledge graph according to one embodiment of the invention. During an "initialize the knowledge graph" step 701, the logical forms of the requests handled by Prolog are indexed in the knowledge graph index. For example, the request might be 'sign up'(me, 'military discount'(me)) that enables a use to sign up for a discount, in this case a military discount.

So, the logical form of the request might have an id of 'r-1':
'sign up'(me, 'military discount'(me))
would be indexed as follows:
Tokeb Node
'sign up' none
'sign" none
up' none
'military' 'miltiary-1" military/Organization
'discount' discount-1' discount/Action The knowledge graph index consists of a token index and a node index. The token index efficiently maps from input tokens to a list of knowledge graph nodes. For example, it maps from the token 'military' to the node 'military-1'. The node index maps efficiently from the nodes to a list of requests.

The node index is then:
'military-1'—('r-1')
'building-1' ('r-534', 'r-987') ' '

Next, in step 703, the logical form join(me, Army) is decomposed into input tokens:
"join"
"Army"
"me"

Next, in step 705, the component input tokens are used to look up nodes in the knowledge graph token index. Continuing this example, the system finds the node army-1:
"army"→"Army"/Organization (army-1)
"join"→not found
"me"→not looked up If an input token maps to multiple nodes, then all of the nodes are explored. If an input token does not map to any nodes, then the system performs a set of operations to try and transform the token into the canonical name of the node in the knowledge graph. For example, lemmatization, pluralization, capitalization, and so on.

In preferred embodiments of the invention, step 707, the system performs a breadth-first intersection search starting from the knowledge graph nodes. In this case, the army-1-concept node is used as a starting point. The search operation fans out in the knowledge graph, following the relations between nodes, by queuing nodes so that the children of a current node are not visited unless all siblings have all been visited. The system will keep increasing the search diameter looking for intersections with the logical form of requests. The search diameter can be constrained by limiting the search to a predetermined number of hops from the starting nodes in embodiments of the invention. The system continues to search the knowledge graph until it reaches a knowledge graph node that indexes at least one request entity, step 709. That is, when reaching a node, the text of the node's name is used to look up requests in the node index.

from Army/Organization (army-1), traverse "branchOf" to "military"/Organization (military-1)

The exploration of the knowledge graph stops because when the algorithm looks up "military" in the knowledge graph index, it finds the request r-1. This is because the token 'military within the predicate 'military discount' was in the request logical form 'sign up'(me, 'military discount'(me)) that is r-1.

In step 711, the system transforms the join, e.g., using (me, Army) and Army-branchOf "military/Organization" to produce:
join(me, military)

Next, in step 713, the system retrieves the requests that were indexed under "military" in the knowledge graph index. For example, a request might be:
'sign up'(me, 'military discount'(me))

In step 715, the system matches the join(me, military) against 'sign up'(me, 'military discount'(me))

This match is performed as a graph match. Graph edit distance may be used to compute the similarity between the input logical form graph and the retrieved request graph. Efficient approximation algorithms are well known in the art. In this case, the match similarity is low because only 'military' matches.

The system collects all of the requests and ranks them by graph match score, in step 717. If graph edit distance is used, the match is in terms of the node addition, deletions, substitutions and relation addition, deletion, and substitution. In addition, a second factor is multiplied based on the average match across the nodes in the input logical form graph and the request logical form graph. The match metric is substring overlap (length of character overlap divided by the length of both strings) but other metrics using WordNet, Word2Vec, vector spaces, and other methods could be used. In the example, the highest ranked request is:
'sign up'(?x, 'military discount'(?x))

Other possible lower ranked requests might be 'join service' (?x, 'insurance service'). All of the bindings for all of the matching requests in ranked order are sent to the natural language generation system and can be used by the dialogue. For example, if the user says they are not looking for a military discount, then the system might ask if they were trying to join an insurance service.

Since the system may not have all of the bindings to process a dialogue goal, it may also have to ask the user for information. For example, if the request for a military discount requires the age of the person, then the system might ask:
Are you interested in a military discount?
If they say "yes" then it might ask:
What is your age?
And then execute the request for the discount.

For a given input logical form, multiple searches can start simultaneously using the knowledge graph. When the system starts traversing the graph with a breadth-first search, the distance can be calculated while searching for neighboring nodes. This can be achieved by storing a variable per node that stores the distance from the start node. In one preferred embodiment, the closer the target node is to the search node, the higher score. Other scoring algorithms are used in alternative embodiments.

Each request logical form is ranked by sorting by the request score. The request score considers three factors in a preferred embodiment:

1) the entity similarity factor: the percentage similarity of the entity strings (the number of overlapping tokens in those strings (a token is a character that is not whitespace) out of the total number of tokens in both strings. Other similarity measures could be used such as edit distance or distance in a vector space. The end result is a number between 0 and 1.

2) the distance factor: the normalized distance from the start node in the knowledge graph to the node matching the request. Thus if 4 was the maximum distance, then match to a request at distance 0 would be 1.0, at distance 1 would be 0.25, distance 2 would be 0.5, distance 3 would be 0.75. and distance 4 would be 1.0.

3) the match factor: the percentage amount using a count of the number of matching entities and relations and number of matching triples in the graphs of the parse logical form and the request logical form. For example (a r (b r2 c)) matching (d r (b r2 c)) the sore would be 1 (for the b match), 1 (for the c match), 1 for the r match, 1 for the r2 match, and 1 for the (b r3 c) triple match, =5 out of a total of 7 possible, 5/7=0.714

The overall ranking is done in one preferred embodiment using a score according to an equation:

Score=entity similarity factor*distance factor*match factor.

In step 719, the system translates the top-ranking request into a question using the natural language generation component. For example, the system response can be the following natural language response:
"Do you want to sign up for a military discount?
In this example, the natural language response makes a logical connection between an indirect utterance and a dialogue goal.

Figure 8:
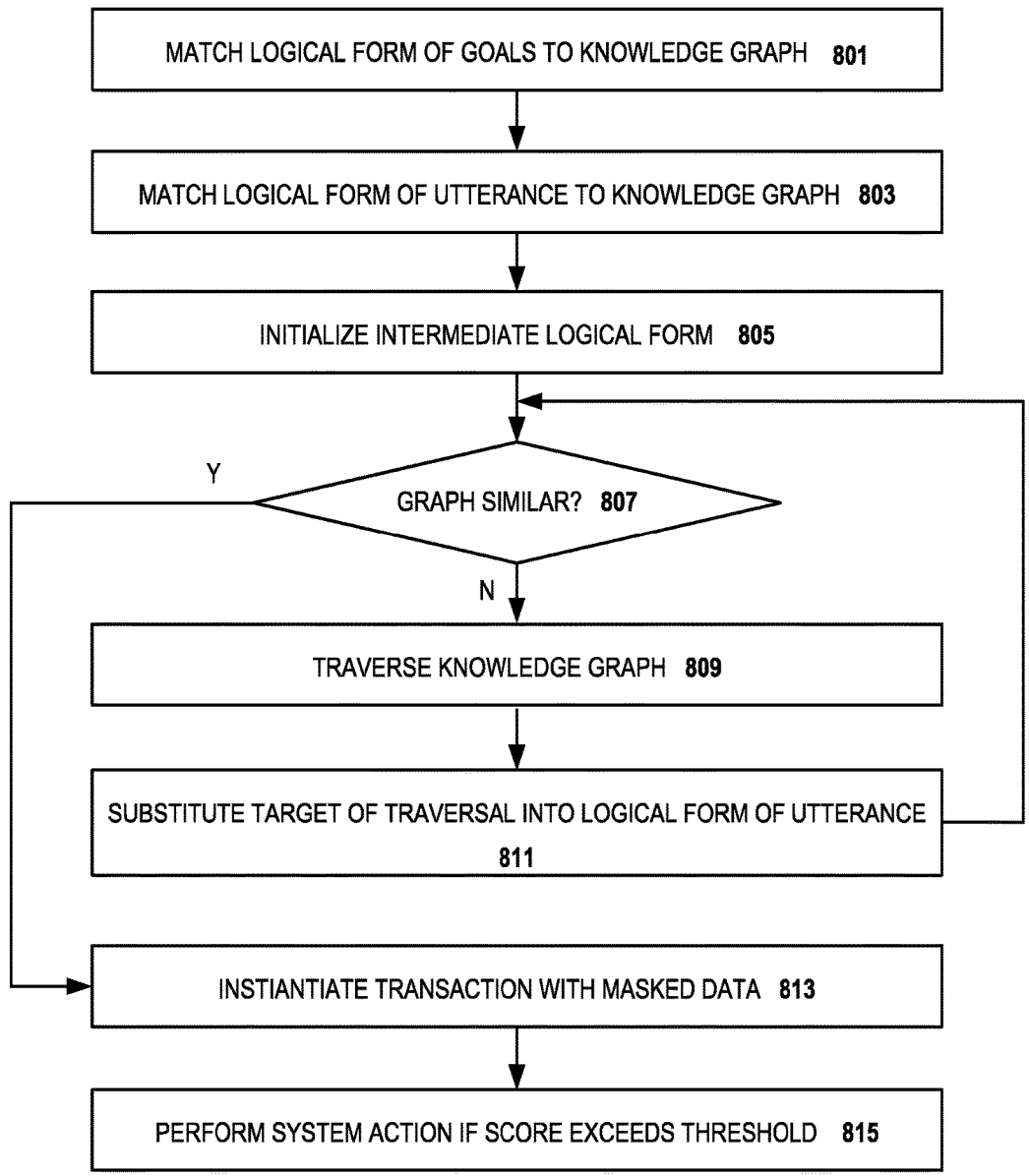
FIG. 8 is a flow diagram performing a system action according to an embodiment of the invention.

FIG. 8 is a flow diagram performing a system action according to an embodiment of the invention. In step 801, the system matches the semantic predicates and terms in the logical form of the goals to entities and relations in the knowledge graph. This excludes data such as money, years, and so forth. In step 803, the system matches the instantiated predicates and terms in the logical form of the utterance to entities in the knowledge graph. This excludes parameters. Next, the system initializes the intermediate logical form to the logical form of the utterance.

In step 807, a comparison of the graph similarities is performed. If the graph similarity between the intermediate logical forms and the logical form of the goals, including matching the masked data from the logical form of the utterance and parameters from the goals, exceeds a threshold, then the system goes to step 813. If not, the system, in step 815, traverses the knowledge graph to identify transformations between the matching predicates and terms in the logical form of the utterance and the matching predicates and terms in the logical form of the transactions. A "best path" is used to traverse the knowledge graph in preferred embodiments of the invention. The best path in the knowledge graph will typically include at least one of a synonym relation, is-a-relation, an N-gram similarity relationship, a relation from a database, or a relation derived through an inference from an ontology. Then, the system substitutes the target of the traversal into the logical form of the utterance to generate an intermediate logical form. The system returns to step 807.

In preferred embodiments of the invention, matching the graph structure of the intermediate logical form to the graph structure of the logical form of the transaction includes adding a disposition operation. The disposition operation is an increase operation, a decrease operation, an add operation and a remove operation in alternative embodiments.

In step 813, the system instantiates the transaction or goal parameters with the masked data. Then, it performs a system action with the instantiated transaction or goal if the score exceeds a threshold.

For example, instead of mapping directly from a logical form like in (me, Army) to increase(discount(me)) using a rule, the invention performs the mapping in steps guided by the knowledge graph. In this case, it might map from in(me. Army) to in(me, military) to +military discount,(me) to discount(me) to increase(discount(me)).

Possible transformations are based upon the relationships extracted into the knowledge graph. For example, an "is-a" relationship might be extracted and thus could be applied to the terms in the logical form of the utterance ("Army" is-a "military"). Various traversal/search algorithms can be used. For example, a beam search over the knowledge graph can be performed.

Since the unmatched portion of the logical form is retained, it can be used for additional data or natural language generation of a question back to the user.

Example

1. User.>I was in the Army in(me, Army).
in(me, military)—is a link between terms found i
+military discount,(me)—term to predicate similarity
discount(me, myhouse)—predicate to predicate similarity
goal: increase(discount(me))—disposition rule
System Response: Yes, we have a military discount. Would you be interested in other types of discounts too?

2. User.>Do I need Flood Insurance?
need(me, Flood Insurance),
require(me, Flood Insurance),—predicate to predicate similarity
require(+coverage,myhouse) is—a link between terms
learn(+require,(coverage, myhouse))) disposition rule
System Response: No. Flood Insurance is not required. Would you like to learn about the types of required coverage?

Embodiments of the invention use a dialogue goal to improve semantic parsing. It is easy to map an utterance like "Book a flight" to the symbolic language of a booking transaction. However, user utterances are rarely so simple. User utterances make statements in an indirect way and this may include language that is not present in the transactions. Semantic parsers may have difficulty mapping such utterances directly to a correct and concise logical form. In these cases, the semantic parser could benefit from a known conversational goal, e.g., a desired transaction. Thus, having an existing dialogue goal could bias semantic parsing toward useful forms. For example, having the goal of taking a trip could bias the semantic parsing toward the semantic form "book(me, trip) correctly even when the input is "I'd like to take a trip". Thus, in embodiments of the invention, the logical form produced by the semantic parser depends upon weights on respective inputs and at least one weight is initialized differently due to making a logical connection to a dialogue goal.

A number of response strategies are used in embodiments of the invention. Given that a dialogue goal has been determined, a number of response strategies are possible:
1. Determine goal: Are you trying to reduce the cost of insuring your vacation home?
2. Differentiate: Are you trying to reduce the cost of insuring your vacation home or get sufficient coverage for it?
3. Helpful: If you would like to reduce the cost, you could try Good Renter discounts. They will save you quite a bit.
4. Congratulatory: Being in the Armed forces is one of the best ways of reducing your costs. Thus, in embodiments of the invention, a system response is based on a connected goal and the system response suggests or recommends the goal to the user.

In addition to the above response strategies, the system may use a delayed response in certain situations. For example, after making a logical connection to a user's goal, the system may log the goal instead of responding right way. For example, it may log the fact that that the person might like the military discount and later when they complain about the overall dialogue, such as the expense of the insurance, respond with recognizing the user's goal, e.g., "before you give up on us, you mentioned that you are in the military and thus may be eligible for a discount". Thus, in this example, the connected goal is not communicated as a natural language response immediately, but is instead communicated to the user in a later dialogue exchange.

Embodiments of the invention can also be used in training the system to adapt these techniques to a new set of questions. A list of common user dialog goals or transactions along with sample queries that attempt to reach those goals are provided to the system. Next, a domain-specific knowledge graph is built that captures the essence of what users might be asking. For example, if there are several questions about military discounts with different verbiage, these questions might be aligned with one 'military_discount' entry in the knowledge graph. The system can thus learn a classifier based upon features of these seed questions (words, syntactic categories). Next, when new queries/dialogs need to be handled, the system can extract these features and classify the question as one of the nodes in the knowledge graph.

Using an embodiment of the invention can also create consistency across user utterances. That is, multiple user utterances may be related to a single goal.

For example: —User: I am in the Army.
User: What about a Good Renter Discount?
>Response: I see you are interested in getting discounts. We offer several.

Multiple statements related to discounts may increase the probability of the desire to get a discount on the insurance, and an appropriate response strategy was invoked. In this example, the statement "I am in the Army" is an indirect utterance which does not appear to be related to a user goal. However, when paired with the question "What about a Good Renter Discount?" a consistent theme between the statements was recognized. The system could learn which goals bridge between utterances using an entity and relation tracking algorithm that finds the same entities and relations in multiple places in the dialogue. Thus, in this example, the system response is based on a connected goal stored from a previous part of the dialogue. In other instances, the system response is based on both the connect goal and a second connected goal stored from a previous part of the dialogue.

In embodiments of the invention, the utterance is identified as an indirect utterance due to an intent classification. A speech act classification according to a speech act rule can be used as part of classification. In different embodiments of the invention, the utterance identified as an indirect utterance is in a speech act classification such as an accept response, an acknowledgement, a social nicety, a rhetorical question, an open-ended question, a reject response and an uncertain response. In yet other embodiments, an or-question, wh-question or other speech acts that can be classified using other intent identification algorithms.

Logical connections may be imperfect due to mismatch between the meaning of the extracted relationships in the knowledge graph and the relationships in the predicates of the logical forms. This can be reduced by designing the type system or extracting relations that are the same as the predicates used in the logical forms. Where this is not the case, relationships should be logical so that traversal of the relation is not likely to introduce a logical inconsistency with the logical form of the goal.

An intermediate symbol such as "discount" or "coverage" can provide a way of mapping from surface forms that deal with examples specific to a particular user ("Air Force" discount or "hurricane damage" coverage) to more general categories that scope over all or most of these examples ("military" discount) or ("accident" coverage). Thus, in embodiments of the invention, at least one part of the parse is connected to at least one part of the user goal. A variety of known techniques can be used such as subsumption, specialization, or abstraction relationships in the knowledge graph.

Embodiments of the invention use bindings to determine the system response. The invention generalizes both with respect to the terms and the predicates. Predicates may be very different ways of expressing an event or action, such as "smashed into my house" or "damage my front door", and this may need to be mapped to "accident" and then to "coverage_event". These more general combinations of predicates and terms can then create logical forms that can be operated on by a back-end system. For example, there may be a known goal for users to increase discounts or increase coverage. Once the more general goal is recognized, if the bindings are present, the system can relate responses at this more general level to the specific bindings at the lower level. For example, responding "Army and other military discounts can decrease your insurance." Thus, in response to an indirect utterance, the system response is a speech act, wherein the speech act can include confirming, explaining, clarifying, or suggesting the goal from the knowledge graph.

Embodiments of the invention use a variety of mitigation strategies for non-logical connections. It may be dangerous to infer more general goals from specific examples. Inferences may be unwarranted. However, there are a number of mitigation strategies. The system response can confirm the user goal ("Were you trying to increase your coverage?"), create an explanation ("Yes, adding glass will increase your coverage"), or clarify the goal ("Yes, you can add glass coverage. Adding this coverage will increase your coverage.")

Different user goals can be confirmed or rejected based on dialogue context. Based upon the dialogue context, particular goals and transactions may be activated, but not completely satisfied or executed. Thus, when making a logical connection, these paths would be most likely. Other goals and transactions might be able to be ruled out. For example, goals may be already established or may be explicitly negated by a user's utterance. In this case, the symbols from these goals and transactions would not be indexed into the knowledge graph or would be given very low weights. For example, the symbols from the goals and transaction may not be connected due to a parse including a negation from the user utterance.

Embodiments of the invention may involve learning from user feedback. The user may respond by providing positive or negative feedback about a goal. Given this feedback, the system can learn to better select particular goals, given the logical form of utterances. For example, the reward function can be used to train a neural network to choose a goal or transaction given the intermediate logical form. The system can also measure a user's responses to the system's answer, e.g., identifying errors via sentiment analysis/cuss word detection. Past interactions can be used to gather data to be used by unsupervised learning algorithms. Thus, in embodiments of the invention, the user goal is selected based on a ranking process. The ranking process in some of these embodiments uses feedback from users on previous system responses that included a connected goal.

The present invention has many advantages over the prior art. While semantic parsing, entity and relationship extraction, knowledge graphs, and graph search and transformation are known in the prior art and can be used in embodiments of the invention, as far as known to the inventors, the prior art is only capable of connecting the logical form of an utterance which has an explicit goal stated in the utterance. The present invention is able to match an indirect utterance to a goal to issue a request, a goal that was unstated in the dialogue.

The prior art does not include the "disposition" rule that adds predicates (e.g., increase, decrease). The idea of the disposition rule is that the system can make a logical connection to a dialogue goal by also including a predicate such as 'increase' or 'decrease'. For example, the requests may be to increase(discount(me)) or decrease(fees(me)) but the intermediate logical form is simply "discount(me)" or "fees(me)". The disposition rule can be applied to assume a user's disposition toward an event, action, or object.

The prior art does not include some of the differences between logical forms and knowledge graphs when establishing the logical connection. In particular, embodiments of the invention use a "term to predicate" similarity in the matching process. In (me, military) is matched against 'military discount'(me) by matching the term 'military; against the predicate 'military discount'. One deficiency in existing systems is that if logical forms are not matched at all and no connection can be made. Adding this additional method of making connections can reduce complete failures to making a logical connection to a dialogue goal. Other embodiments of the invention use a different matching process including a linguistic matching process, a semantic matching process, a structural matching process, a syntactic matching process and a probabilistic matching process.

As discussed above, the logical forms of utterances from semantic parsing may not map directly to goals. To bridge this gap, the embodiments use a knowledge graph, e.g., a knowledge graph generated from a set of documents related to the utterances. For example, the documents may be a web site that people read and then have a dialogue about. The system performs entity and relationship extraction on the documents to generate a graph of entities connected through relationships. For example, an entity labeled "Army" may be connected via an "is-a" relationship to an entity labeled "military".

During processing of the dialogue, the utterance is parsed using a semantic parser (e.g., a combinatorial categorical grammar parser). The logical form of the utterance is then matched against the existing goals established in the dialogue. If the goal has not been stated (and thus does not match), the logical form of the utterance is then decomposed into tokens, predicates, terms, and values (e.g., numbers). The system then matches the predicates and terms against the labels in the knowledge graph of entities and relationships and preserves the logical form through a set of transformations/derivations as it searches to find a match to one of the unstated goals that are in service of the transactions. The final match is in terms of the graph structure of the transformed logical form of the utterance and the graph structure of the (unstated) goal in the knowledge graph. Given the match, the variables in the goal can be bound to the data in the utterance and then the system can respond in the dialogue as if the goal were explicitly stated or through various response strategies. As some of the entities in the knowledge graph are from web resources, the resulting logical form can include at least one term or predicate mapped to a web resource. The web resource may be linked to other web resources in a graph structure.

Embodiments of the invention cover cases where the user goal is not stated in the utterance but it was established previously by the user, where the user goal is not stated in the utterance but it was established previously by the conversational system and the user goal is not stated in the utterance and it is not previously established at all. It is simply a request that could be issued and the user's indirect utterance connects to it.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for responding to an indirect utterance in a dialogue between a user and a conversational system comprising:
responsive to receiving the indirect utterance, generating a parse structure of the indirect utterance, wherein the indirect utterance is an utterance having elements which do not match a user goal expressed as elements of a knowledge graph, wherein the knowledge graph comprises user goals expressed as elements;
connecting the parse structure through the knowledge graph to a user goal to issue a request which is not stated in the indirect utterance, wherein the connecting includes a matching process which matches the parse structure with the user goal according to degree of structural similarity;
performing a system response, wherein the system response is a dialogue system response based on a combination of the parse structure and the connected user goal.

2. The method as recited in claim 1, wherein the parse structure is one of a logical form, a constituency parse, phrase structure parse, dependency parse, universal dependency parse and an enhanced dependency parse.

3. The method as recited in claim 1, wherein the indirect utterance is one of a short text, an ungrammatical text, a chat text, a text message, a sentence in a natural language and transcribed speech in a dialogue exchange.

4. The method as recited in claim 2, wherein a term to predicate similarity measure is used in the matching process.

5. The method as recited in claim 2, wherein the matching process is selected from a group consisting of a linguistic matching process, a semantic matching process, a structural matching process, a syntactic matching process and a probabilistic matching process.

6. The method as recited in claim 1, wherein the parsing structure is a logical form produced by a semantic parser which depends upon weights and at least one weight is initialized differently due to making a logical connection to a dialogue goal.

7. The method as recited in claim 6, wherein the logical form includes at least one term or predicate mapped to a web resource.

8. The method as recited in claim 1, wherein the system response is based on a connected goal and the system response includes the goal.

9. The method as recited in claim 8, wherein the connected goal is not communicated as a natural language response immediately but is instead communicated to the user in a later dialogue exchange.

10. The method as recited in claim 2, wherein the user goal is selected based on a ranking process.

11. The method as recited in claim 2, wherein the ranking process uses feedback from users on previous system responses that included a connected goal.

12. Apparatus, comprising:
a processor;
computer memory holding computer program instructions executed by the processor for responding to an indirect utterance in a dialogue between a user and a conversational system, the computer program instructions comprising:
program code responsive to receiving the indirect utterance, operative to generate a parse structure of the indirect utterance, wherein the indirect utterance is an utterance having elements which do not match a user goal expressed as elements of a knowledge graph, wherein the knowledge graph comprises user goals expressed as elements;
program code, operative to connect the parse structure through the knowledge graph to a user goal to issue a request which is not stated in the indirect utterance, wherein connecting the parse structure includes a matching process which matches the parse structure with the user goal according to degree of structural similarity;
program code, operative to perform a system response, wherein the system response is a dialogue system response based on a combination of the parse structure and the connected user goal.

13. The apparatus as recited in claim 12, wherein the parse structure is one of a logical form, a constituency parse, phrase structure parse, dependency parse, universal dependency parse and an enhanced dependency parse.

14. The apparatus as recited in claim 12, wherein at least one part of the parse is connected to at least one part of the user goal through subsumption, specialization, or abstraction relationships in the knowledge graph.

15. The apparatus as recited in claim 12, wherein the system response performs a speech act, wherein the speech act can include confirming, explaining, clarifying, or suggesting the goal.

16. A computer program product in a non-transitory computer readable medium for use in a data processing system, the computer program product holding computer program instructions executed by the data processing system for responding to an indirect utterance in a dialogue between a user and a conversational system, the computer program instructions comprising:
program code responsive to receiving the indirect utterance, operative to generate a parse structure of the indirect utterance, wherein the indirect utterance is an utterance having elements which do not match a user goal expressed as elements of a knowledge graph, wherein the knowledge graph comprises user goals expressed as elements:
program code, operative to connect the parse structure through the knowledge graph to a user goal to issue a request which is not stated in the indirect utterance, wherein connecting the parse structure includes a matching process which matches the parse structure with the user goal according to degree of structural similarity;
program code, operative to perform a system response, wherein the system response is a dialogue system response based on a combination of the parse structure and the connected user goal.

* * * * *